Patented Oct. 11, 1938

2,132,588

UNITED STATES PATENT OFFICE 2,132,588

DIAROMATIC PEROXIDE

Jan Straub, Amsterdam, Netherlands, assignor to Albert Gerrit Oosterhuis, Amsterdam, Netherlands No Drawing. Application June 29, 1937, Serial No. 151,065. In the Netherlands May 12, 1936

4 Claims. (Cl. 260—610)

The present invention relates to a process for the production of water insoluble diaromatic peroxides by the reaction between aromatic acid chloride and alkaline peroxide solution, the process being characterized by the presence of a dispersing agent while carrying out the process. The resultant products may be used in the bleaching of flour or for bleaching purposes generally.

The preparation of water insoluble organic peroxides is generally effected by allowing to react an acid chloride and an alkaline solution of hydrogen peroxide under vigorous agitation, to which solution may be added, according to various known methods sodium acetate, phosphates or other salts for maintaining a determined value of the pH, particularly in the preparation of the very alkaline sensitive aliphatic and aliphatic aromatic peroxides. When preparing the latter substances the addition of soap as emulsifying agent is also known.

I have found that the presence of an emulsifying agent is advantageous during the preparation of diaromatic peroxides. This agent enables the stirrer to convert the acid chloride introduced in the form of a very fine emulsion, in which form it reacts in a more favorable way with the peroxide than without the presence of an emulsifying agent. I may use as emulsifying agent various substances having this property and not being too strongly attacked by the chemicals present. Suitable emulsifying agents are e. g. sulphonated oils, soaps, taurocholic acid, saponine, lecithine.

The practical importance of adding an emulsifying agent appears by comparison of the preparation methods with and without these agents, no further modifications being made.

In all cases where an emulsifying agent is present I obtain more easily a purer product with a smaller content of acid chloride as an impurity, which is of particular importance in the preparation of liquid diaromatic peroxides. In the preparation of solid peroxide, moreover, the crystals formed tend less to agglomerate and are easily obtained in the form of a beautiful crystal flour after drying. The conglomeration of the primary crystals can be simply prevented by mixing with an inert powder. Microscopically the crystals are clearly distinguished from a crystal flour obtained by grinding. The drying can also be omitted and the product washed out put on the market in damp form, if desired even with more water and a protective colloid to form a stable suspension.

My invention is elucidated by, but not restricted to the following examples:

1. A mixture of equal parts of metatoluyl acid chloride and ortho toluyl acid chloride, in total 10 g., is introduced by drops under vigorous agitation into a cooled solution of 6 g. of sodium peroxide in 1650 g. of water, to which has been added 0.10 g. of ricinolic acid. An emulsion of chloride is formed, which is converted into an emulsion of peroxide, which separates slowly as a heavy liquid layer, which separation may be furthered if desired by adding acids or salts to the solution.

A mixture of meta-meta, ortho-ortho and meta ortho toluyl peroxide is obtained in a yield of approximately 90% of the theory. The product obtained does not contain toluyl acid chloride as appears when adding silver nitrate to the acetonic solution.

2. 12 g. of benzoyl chloride are introduced by drops under vigorous agitation to a cooled solution of 5 g. of sodium hydroxide and 5 g. of 30% hydrogen peroxide in 400 g. of water, to which 0.10 g. of oleic acid has been added. An emulsion of chloride is formed which is converted into a very finely divided benzoyl peroxide crystal, collecting for the most at the surface of the solution. By controlling the introduction speed of the chloride and the stirring speed the fineness of the product can be easily controlled, e. g. between $1–3\mu$ or $5–10\mu$. Filtering and washing out a product of such fineness is still feasible. These manipulations may be facilitated by incorporating an inert inorganic or organic powder into the liquid. The output is 9,5–10 g. of benzoyl peroxide of a purity of 98,5–99,5%, determined by peroxide titration which is a yield of 90–95% of the theory.

Instead of 0,10 g. of oleic acid one may use 0,10 g. of saponine or 0,10 g. of sodium taurocholate, or 0,10 g. of lechithine or 0,10 g. of Turkish red oil.

What I claim is:

1. A process of forming water insoluble diaromatic peroxides in which at least one acid chloride of aromatic acids and alkaline peroxide solution are converted in presence of a dispersing agent which does not substantially react with the said reagents.

2. A process of forming water insoluble diaromatic peroxides in which at least one acid chloride of aromatic acids and alkaline peroxide solution are converted in presence of a substance selected from the group consisting of oleic acid, ricinoleic acid, Turkish red oil, sodium taurocholate, saponine and lechithine.

3. An aqueous suspension of a diaromatic peroxide consisting substantially of uniform particle of a size below 10µ which suspension contains a protective colloid.

4. An aqueous suspension of a diaromatic peroxide consisting substantially of uniform particles of a size below 10µ and an inert powdery substance, which suspension contains a protective colloid.

JAN STRAUB.